(12) United States Patent
Deygout et al.

(10) Patent No.: US 7,060,743 B2
(45) Date of Patent: Jun. 13, 2006

(54) BITUMEN COMPOSITION

(75) Inventors: François Julien Raoul Deygout, Petit Couronne (FR); Alain Marcel Bernard Seive, Petit Couronne (FR)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/530,681

(22) PCT Filed: Oct. 10, 2003

(86) PCT No.: PCT/EP03/50707

§ 371 (c)(1),
(2), (4) Date: Jun. 28, 2005

(87) PCT Pub. No.: WO2004/033547

PCT Pub. Date: Apr. 22, 2004

(65) Prior Publication Data

US 2006/0052488 A1    Mar. 9, 2006

(30) Foreign Application Priority Data

Oct. 11, 2002    (EP)    ................................ 02292520

(51) Int. Cl.
*C08L 95/00*    (2006.01)

(52) U.S. Cl. ............................ 524/68; 524/69; 524/70; 524/71

(58) Field of Classification Search ............ 524/68–71
See application file for complete search history.

(56) References Cited

U.S. PATENT DOCUMENTS 4,332,703 A  *  6/1982  Lijzenga et al. .............. 524/68

FOREIGN PATENT DOCUMENTS

EP            0037136        10/1981

OTHER PUBLICATIONS

International Search Report dated Dec. 22, 2003.

* cited by examiner

*Primary Examiner*—Peter Szekely

(57) ABSTRACT

The present invention provides a bitumen composition including: —(i) from 0.1 to 25% wt of an elastomer, (ii) from 0.1 to 40% wt of a solvent, (iii) from 30 to 99% wt of a bitumen, (iv) from 0.1 to 30% wt of a lithium salt of a $C_{10}$–$C_{40}$ fatty acid or hydroxy fatty acid, and optionally (v) from 0 to 70% wt of a filler, all weights based on total bitumen composition, wherein the solvent is of general formula (I),

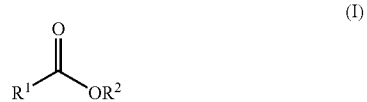

wherein $R^1$ represents a hydrogen atom or a hydrocarbyl group having from 1 to 6 carbon atoms, $R^2$ represents a hydrocarbyl group having from 1 to 6 carbon atoms, and the sum of the carbon atoms in $R^1$ and $R^2$ is from 5 to 7; a process of preparing said bitumen composition and the use of the composition as a cold-applicable adhesive.

24 Claims, No Drawings

BITUMEN COMPOSITION

FIELD OF THE INVENTION

The present application is a 35 U.S.C. 371 national stage filing of PCT/EP2003/050707 filed Oct. 10, 2003 claiming priority from European patent application 02292520.0 filed Oct. 11, 2002, hereby incorporated by reference.

The present invention relates to a bitumen composition, a process of preparing a bitumen composition, and the use of a bitumen composition as an adhesive.

BACKGROUND OF THE INVENTION

Bitumen is a versatile material that is widely used in civil engineering. One use of bitumen is as an adhesive for repairing cracks in buildings and road surfaces, and as a joint sealant. When used as an adhesive, it is generally necessary to heat the bitumen to a temperature where it becomes workable before it can be applied. However, for certain applications this is inconvenient and bitumen compositions have been developed which are cold-applicable, i.e. they may be applied as an adhesive without the need for heating. One such composition is described in EP-A 37136.

The compositions of EP-A 37136 are cold-applicable adhesives that comprise bitumen, an elastomer, and a lithium salt of a fatty acid. The lithium salt acts as a thixotropic agent, causing the composition to harden after application. The compositions have the ability to bond to many substrates in cold and damp conditions and are widely used as sealants on metal, concrete and brickwork; in the roofing industry; and in hydraulic applications, for example as sealants for canal linings or waterproofing cement concrete dams.

To facilitate application, the compositions of EP-A 37136 may further comprise an aromatic hydrocarbon solvent (e.g. benzene, toluene, xylene etc) or a halogenated hydrocarbon solvent (e.g. dichloromethane or 1,1,1,-trichloroethane). These solvents evaporate after application, causing the composition to harden or cure.

To date, the only solvents considered suitable for use in cold-applicable compositions such as those described in EP-A 37136 are aromatic hydrocarbon solvents or halogenated solvents; 1,1,1,-trichloroethane being especially preferred. However, in recent years it has been found that aromatic hydrocarbon and halogenated solvents are harmful to the environment and may have detrimental effects on human health. Therefore, it would be advantageous if there was a means of replacing these solvents in cold-applicable bituminous adhesives.

SUMMARY OF THE INVENTION

It has now surprisingly been found that a bitumen composition comprising an ester-based solvent has excellent properties for use as a cold-applicable adhesive. As well as having properties approaching or equal to those of compositions comprising halogenated or aromatic hydrocarbon solvents, the compositions are an improvement on existing formulations in that the ester-based solvents are more desirable from an environmental perspective and do not pose a threat to human health.

Accordingly, the present invention provides a bitumen composition comprising:
(i) from 0.1 to 25% wt of an elastomer,
(ii) from 0.1 to 40% wt of a solvent,
(iii) from 30 to 99% wt of a bitumen,
(iv) from 0.1 to 30% wt of a lithium salt of a $C_{10}$–$C_{40}$ fatty acid or hydroxy fatty acid, and optionally
(v) from 0 to 70% wt of a filler, all weights based on total bitumen composition, wherein the solvent is of general formula (I):

wherein $R^1$ represents a hydrogen atom or a hydrocarbyl group having from 1 to 6 carbon atoms, $R^2$ represents a hydrocarbyl group having from 1 to 6 carbon atoms, and the sum of the carbon atoms in $R^1$ and $R^2$ is from 5 to 7.

DETAILED DESCRIPTION OF THE INVENTION

The bitumen composition of the present invention comprises from 0.1 to 40% wt of a solvent of general formula (I). The amount of solvent may vary depending on the manner in which the bitumen composition is to be applied. For example, where the composition is applied using a spatula, hand-held cartridge or application-gun for precise application, the amount of solvent may conveniently be in the range of from 5 to 15% wt, preferably 9 to 12% wt, based on total bitumen composition. However, when the bitumen composition is to be applied as a spray to treat a large surface area, the amount of solvent may conveniently be in the range of from 15 to 30% wt, based on total composition.

Preferably, in general formula (I) $R^1$ and $R^2$ each independently represent a hydrocarbyl group having from 1 to 6 carbon atoms. The hydrocarbyl groups of general formula (I) are unsubstituted. The hydrocarbyl groups may be straight or branched chain, saturated or unsaturated; preferred hydrocarbyl groups being alkyl or alkenyl groups having from 1 to 6 carbon atoms, more preferably alkyl groups having from 2 to 4 carbon atoms, e.g. ethyl, propyl, and butyl groups. Particularly preferred are n-alkyl groups having from 2 to 4 carbon atoms.

In general formula (I), the sum of the carbon atoms in $R^1$ and $R^2$ is from 5 to 7. This is because when the sum of the carbon atoms is greater than 7, the curing times of the composition are too slow; and when the sum of the carbon atoms is less than 5, the solvents are too flammable to be used safely in the compositions. Preferably, the sum of the carbon atoms in $R^1$ and $R^2$ is 6.

When the bitumen composition of the present invention is applied, the solvent of general formula (I) will evaporate and the composition will cure. The time taken for the composition to cure will vary depending on the thickness of composition applied, however, curing times will conveniently be in the range of from 7 to 60 days, preferably from 10 to 30 days. In this regard it is preferred that the solvent of general formula (I) has a boiling point of from 110 to 180° C., more preferably from 120 to 160° C.

In a preferred embodiment of the present invention the bitumen composition comprises a solvent of general formula (I) wherein $R^1$ and $R^2$ each independently represent an alkyl group having from 2 to 4 carbon atoms and the sum of the carbon atoms in $R^1$ and $R^2$ is 6. Examples of solvents that may very conveniently be used in accordance with this embodiment include ethyl valerate, ethyl isovalerate, ethyl 2-methylbutyrate, n-propyl butyrate, isopropyl butyrate, n-butyl propionate, and isobutyl propionate.

The solvents of general formula (I) are esters that are commercially available and/or readily prepared by known chemistry. A solvent of general formula (I) which gives very good results when used in the present invention is n-butyl propionate, which can be obtained from the Eastman Chemical Company or the Dow Chemical Company (boiling point 145° C.).

The bitumen (iii) of the present invention may be a naturally occurring bitumen or a bitumen derived from a mineral oil, e.g. a cracked residue, or a blend of various bitumen types.

Examples of bitumen that may be conveniently used in the present invention include distillation or "straight run" bitumen, precipitation bitumen (e.g. propane bitumen), and oxidised or air-blown bitumen. Other bitumen that may be used include mixtures of one or more of these bitumen with extenders such as petroleum extracts, distillates or residues, and oils. Preferably, the bitumen is a distillation or "straight run" bitumen, optionally containing an extender.

Preferably, the bitumen (iii) has a penetration from 100 to 300 dmm, more preferably from 140 to 260 dmm (measured at 25° C. according to EN 1426). The softening point of the bitumen is preferably from 30 to 50° C., more preferably 34 to 43° C. (measured according to EN 1427).

The amount of bitumen in the bitumen compositions is preferably from 30 to 75% wt, more preferably 30 to 60% wt, and most preferably 35 to 50% wt, based on total bitumen composition.

The bitumen composition of the present invention comprises from 0.1 to 25% wt of an elastomer (i). Preferably, the amount of elastomer is from 0.2 to 10% wt, more preferably 0.5 to 6% wt and most preferably 1 to 3% wt, based on total bitumen composition.

A wide variety of elastomers may be used in the bitumen composition of the present invention. Examples of elastomers that may be conveniently used include polyesters, polyacrylates, polysulphides, polysilicones and polyesteramides that show elastomer behavior.

A class of elastomer that may very conveniently be used in accordance with the present invention are elastomers based upon polymers of dienes, such as butadiene or isoprene, or copolymers of such dienes with a vinyl aromatic compound such as styrene.

Accordingly, in a preferred embodiment of the present invention the elastomer (i) is a block copolymer comprising at least two terminal poly(monovinylaromatic hydrocarbon) blocks and at least one central poly(conjugated diene) block, forming a continuous network.

Preferably the block copolymer of the preferred embodiment is selected from the group consisting of those of formulae $A(BA)_m$ or $(AB)_nX$, wherein A represents a block of predominantly poly(monovinylaromatic hydrocarbon), wherein B represents a block of predominantly poly(conjugated diene), wherein X represents the residue of a multivalent coupling agent and wherein n represents an integer $\geq 1$, preferably $\geq 2$, and m represents an integer $\geq 1$, preferably m is 1.

More preferably the A blocks represent predominantly poly(styrene) blocks and the B blocks represent predominantly poly(butadiene) or poly(isoprene). Most preferably the B blocks are predominantly poly(butadiene). Multivalent coupling agents to be used include those commonly known in the art. With the term "predominantly" it is meant that the respective blocks A and B may be mainly derived from monovinyl aromatic hydrocarbon monomer and conjugated diene monomer, which monomers may be mixed with other structurally related or non-related co-monomers, e.g. monovinyl aromatic hydrocarbon monomer as main component and small amounts (up to 10%) of other monomers or butadiene mixed with isoprene or with small amounts of styrene. More preferably the copolymers contain pure poly(styrene), pure poly(isoprene) or pure poly(butadiene) blocks.

Preferably the A blocks of the block copolymers have an apparent mol wt. in the range of from 3,000 to 100,000, preferably in the range of from 5,000 to 50,000; whilst the B blocks preferably have an apparent mol wt. in the range of from 10,000 to 300,000, more preferably in the range of from 40,000 to 200,000, and most preferably in the range of from 45,000 to 120,000.

The originally prepared poly(conjugated diene) blocks usually contain in the range of from 5 to 50 mol % of vinyl groups, originating from 1,2 polymerisation relative to the conjugated diene molecules, and preferably a vinyl content in the range of from 10 to 25%.

The block copolymers to be used according to the present invention preferably contain polymerised vinyl aromatic monomers in an amount in the range of from 10 to 60% by weight, more preferably in the range of from 15 to 45% by weight.

The apparent molecular weight of the total block copolymer will preferably be in the range of from 50,000 to 600,000 and more preferably in the range of from 150,000 to 550,000.

The block copolymers may optionally be hydrogenated. The hydrogenation may be complete or partial and may be achieved, if desired, by techniques well known in the art.

Preferred elastomers for use in the present invention are available from Kraton B.V. (Kraton is a trademark), for example Kraton D-1184.

The bitumen composition of the present invention comprises a lithium salt of a $C_{10}$–$C_{40}$ fatty acid or hydroxy fatty acid (iv). Preferably, the amount of lithium salt is from 0.5 to 20% wt, more preferably 1 to 10% wt and most preferably 2 to 6% wt, based on total bitumen composition.

Preferred lithium salts according to the present invention are lithium salts of fatty acids or hydroxy fatty acids having 12–22 carbon atoms. Examples of lithium salts which may very conveniently be used include lithium stearate, lithium hydroxystearate, lithium palmitate and lithium hydroxypalmitate; lithium stearate being particularly preferred. Lithium salts of unsaturated fatty acids may also be applied as well as mixtures of various lithium salts of fatty acids or hydroxy fatty acids.

The bitumen composition of the present invention may optionally contain one or more fillers (v). The amount of filler may be up to 70% wt based on total composition. Preferably, the amount of filler, when present, is in the range of from 15 to 60% wt, more preferably 25 to 50% wt, based on total composition. The filler may be inorganic or organic in nature. Examples of fillers that may be conveniently used include chalk, limestone, unbaked powdered gypsum, talcum, fly ash, coal combustion waste, pigments such as titanium dioxide, iron oxide, chromium oxide, diatomaceous earth and other clays, quartz flour, calcium carbonate and fumed silica. A filler which has been found to give very good results in the present invention is calcium carbonate filler.

For the avoidance of doubt, and as will be readily understood by those skilled in the art, in the bitumen composition of the present invention the total amount of components (i), (ii), (iii), (iv) and (v) does not exceed 100% wt of the total bitumen composition.

The bitumen composition of the present invention may further comprise additional additives conventionally used in bituminous adhesives, such as anti-oxidants, microbicides and water repellents.

The bitumen composition of the present invention may be prepared by various methods known to those skilled in the art. However, a preferred method of preparing the composition comprises adding the elastomer as a solution in the solvent to a pre-blend of bitumen and lithium salt. It is preferred to prepare the composition in this way as in order to mix the bitumen and lithium salt it is often necessary to heat the bitumen to high temperature, and this may decompose any elastomer present. However, it can be difficult to mix the elastomer directly into the pre-blend of bitumen and lithium salt, and it is therefore advantageous to dissolve the elastomer in the solvent prior to addition.

Accordingly, the present invention further provides a process of preparing a bitumen composition which comprises mixing a first component (A) comprising (i) from 0.1 to 25% wt of an elastomer, and (ii) from 0.1 to 40% wt of a solvent; with a second component (B) comprising (iii) from 30 to 99% wt of a bitumen, (iv) from 0.1 to 30% wt of a lithium salt of a $C_{10}$–$C_{40}$ fatty acid or hydroxy fatty acid, and optionally (v) from 0 to 70% wt of a filler, all weights based on total bitumen composition, wherein the solvent is of general formula (I)

(I)

wherein $R^1$ represents a hydrogen atom or a hydrocarbyl group having from 1 to 6 carbon atoms, $R^2$ represents a hydrocarbyl group having from 1 to 6 carbon atoms, and the sum of the carbon atoms in $R^1$ and $R^2$ is from 5 to 7.

Materials and quantities described hereinabove as being preferred with regard to the bitumen composition of the present invention, are similarly preferred with regard to the process of the invention.

Component (A) of the process may be prepared conveniently by dissolving the elastomer in the solvent of general formula (I) at ambient temperature (25° C.). The amount of elastomer to solvent in component (A) may vary, however, component (A) may conveniently comprise from 1 to 25% wt, more preferably from 5 to 15% of elastomer, based on total (A) component. Where the bitumen composition comprises additional additives such as anti-oxidants or water repellents, these are preferably incorporated into component (A)

Component (B) is preferably prepared by heating the bitumen to a temperature in the range of from 200 to 300° C., more preferably 220 to 280° C., and then adding the lithium salt. The bitumen and lithium salt are then mixed, preferably by a mechanical mixer at a rate of greater than 500 rpm, more preferably from 800 rpm to 1200 rpm, until a homogenous blend is obtained. If required a filler is added to the mixture at elevated temperature, preferably of from 200 to 300° C.

Component (A) may be mixed into component (B) at ambient temperature (25° C.), however, if required the (B) component may be heated to a temperature of up to 80° C., preferably from 50 to 80° C. to facilitate mixing. Whilst the relative amount of component (A) to component (B) may vary, the weight ratio of component (A) to component (B) may be conveniently in the range of from 1:20 to 1:5, more preferably from 1:12 to 1:6, based on total amount of (A) and (B).

The bitumen composition of the present invention may be cold-applied and used on a wide variety of substrates, including metal, concrete, wood and felt, even under damp conditions. Accordingly, the present invention further provides for the use of a bitumen composition according to the present invention as a cold-applicable adhesive. By 'cold-applicable' it is meant that the composition may be applied at ambient temperature (25° C.), without needing to heat the composition.

When used as a cold-applicable adhesive, the composition is especially useful as a joint sealant and for waterproofing concrete surfaces. When the composition is to be applied to a specific area (e.g. when used as a joint sealant) the composition may be conveniently applied at ambient temperature by means of a spatula, a hand-held cartridge or any other suitable application device: where the composition is to be applied over a large surface area, it may conveniently by applied by spray or by brush. When used in very cold conditions, a minor amount of high-boiling point (at least 200° C.) diluent may conveniently be added to the composition. Examples of diluents that may be used include aliphatic hydrocarbons, ethers, and di- or polyglycols that have a boiling point of at least 200° C.

The present invention will be further understood from the following illustrative examples.

EXAMPLES

In the following examples a selection of solvents were tested to evaluate their ability to dissolve elastomer, and the performance of cold-applicable bituminous adhesives comprising the solvents compared with a known composition comprising 1,1,1-trichloroethane.

Solubility Test

A variety of solvents were selected, and their ability to dissolve elastomer assessed by preparing 10% wt solutions of elastomer in each solvent. The elastomer employed was a non-hydrogenated radial styrene-butadiene-styrene block copolymer having an apparent molecular weight of 420,000 and a styrene content of 30% wt. (Kraton D-1184, obtained from Kraton B.V.: 'Kraton' is a trade mark).

The results of the tests showed three general solvent behaviours, categorised as: a) 'Dissolved'—the elastomer completely dissolved in the solvent: b) 'Swelling'—the elastomer swelled to form a gel, and c) 'Scattering'—the elastomer formed a dispersion in the solvent, which took on the appearance of a milky liquid (fine scattering) or a suspension of coarse particles (coarse scattering).

The results of the solubility test are shown in Table 1. Where the elastomer dissolved, the time taken for it to dissolve completely is indicated.

The solubility results in Table 1 show that the use of non-aromatic aliphatic hydrocarbon solvents results in an unusable gel, whilst hydroxy functionalised solvents such as ethyl lactate and methyl proxitol form dispersions. Other than 1,1,1-trichloroethane, the solvents which dissolved the elastomer completely were n-butyl propionate, decahydro naphthalene (DHN) and n-propyl bromide.

TABLE 1

| Solvent | Solubility | Dissolving Time (25° C.) |
| --- | --- | --- |
| Shellsol D25[1] | Swelling | Not Soluble |
| Isoparaffin blends[2] | Swelling | Not Soluble |
| DHN[3] | Dissolved | 4 hours |
| n-Butyl Propionate[4] | Dissolved | 2 hours |
| Methyl Proxitol[5] | Scattering (coarse) | Not Soluble |
| Methyl Proxitol Acetate[6] | Scattering (fine) | Not Soluble |
| n-Propyl Bromide[7] | Dissolved | 1 hour |
| Ethyl lactate[8] | Scattering (coarse) | Not Soluble |
| PGPE[9] | Scattering (fine) | Not Soluble |
| 1,1,1,-Trichloroethane | Dissolved | 1 hour |

[1]A low aromatic content hydrocarbon solvent obtained from Shell Chemicals ('Shellsol' is a trade mark).
[2]A mixture of non-chlorinated hydrocarbon solvents obtained from Dercam under the trade names 'Evolve CH 10', 'Evolve CH 12' and 'Evolve CH 14' ('Evolve' is a trade mark)
[3]Decahydro naphthalene (DHN) obtained from Degussa-Huls A.G.
[4]EtCO$_2$Bu - obtained from the Eastman Chemical Company.
[5]1-Methoxy-2-propanol (CH$_3$OCH$_2$CH(OH)CH$_3$) obtained from Shell Chemicals.
[6]1-Methoxy-2-propanol acetate (CH$_3$CO$_2$CH(CH$_3$)CH$_2$OCH$_3$) obtained from Shell Chemicals.
[7]CH$_3$CH$_2$CH$_2$Br obtained from Dercam.
[8]CH$_3$CH(OH)CO$_2$Et obtained from the Dow Chemical Company TABLE 1-continued

| Solvent | Solubility | Dissolving Time (25° C.) |
| --- | --- | --- |

[9]Propylene glycol n-propyl ether (n-PrOCH$_2$CH(OH)CH$_3$)(PGPE) obtained from the Dow Chemical Company under the trade name Dowanol PNP ('Dowanol' is a trade mark)

Adhesive Testing

Bitumen compositions were prepared using a variety of solvents and their performance as adhesives evaluated.

The bitumen compositions were prepared by manually blending a mixture of elastomer and solvent (component A) into a pre-prepared mixture of bitumen, lithium stearate and filler (component B), at a temperature of 60° C. The weight ratio of component A to component B was 3:17 (i.e. 15% wt of A, and 85% wt of B).

The B component comprised 48.4% wt of a naphthenic straight run bitumen having a penetration at 25° C. from 160 to 220 dmm (measured according to EN 1426), 5.6% wt of lithium stearate, and 46.0% wt of a calcium carbonate filler, all weights based on total B component. The B component was prepared by heating the bitumen to a temperature of approximately 250° C., and then adding the lithium salt and mixing for 1 hour with a mechanical mixer at a rate of 1000 rpm. The filler was then added at a temperature of 220° C., and the mixture stirred until an homogenous blend was obtained.

The bitumen compositions were cold applied (25° C.) using a wide spatula to a dry brick surface, a damp brick surface and to a brick surface under water. The adhesive performance of the compositions was assessed, and the curing performance assessed after 1 week under the respective conditions.

The results are shown in Table 2.

TABLE 2

| | Ex. 1 | Ex. 2 (comp.) | Ex. 3 (comp.) | Ex. 4 (comp.) | Ex. 5 (comp.) | Ex. 6 (comp.) |
| --- | --- | --- | --- | --- | --- | --- |
| Solvent | n-Butyl Propionate | n-Propyl Bromide | DHN | Methyl Proxitol | Methyl Proxitol Acetate | 1,1,1-Trichloroethane |
| Adhesion:- | | | | | | |
| Dry surface | ++ | ++ | ++ | ++ | ++ | ++ |
| Damp surface | ++ | − | + | − | + | ++ |
| Under water | ++ | − | + | −− | + | ++ |
| Curing:- | | | | | | |
| Dry surface | + | ++ | − | + | − | ++ |
| Under water | + | NT | − | NT | + | + |

Good ++;
Medium +;
Poor −;
Bad −−
NT = Not Tested
Adhesion
Good: Complete adhesion during application.
Medium: Some areas of non-adhesion during application.
Poor: Predominantly non-adhesion during application.
Bad: Complete non-adhesion during application.
Curing
Good: All solvent evaporated/migrated to leave a hard material.
Medium: Most solvent evaporated/migrated but material not yet fully hard.
Poor: Large amount of solvent remains and material still soft.
Bad: No curing: the material is largely unchanged from the time of application.

From Table 2 it can be seen that only the composition of Example 1 (containing n-butyl propionate) displays good adhesion in all conditions, satisfactory curing, and an overall performance approaching that of the composition containing 1,1,1-trichlorethane (Example 6).

To compare directly the curing performance of a composition according to the invention with a composition comprising 1,1,1-trichloroethane as solvent, two further compositions were prepared in an analogous manner to that described for Examples 1 to 6. The compositions were applied to bricks and curing monitored in dry conditions and under water, including periodic weighing of samples to assess solvent loss.

The contents and performance of the compositions are shown in Table 3. In Table 3 the designations Good, Medium, Poor and Bad are as defined in Table 2.

From Table 3 it can be seen that the bitumen composition according to the present invention (Example 7) displays a curing performance approaching that of the composition comprising 1,1,1-trichloroethane (Example 8) under dry conditions, and a superior performance to that of Example 8 when left to cure under water.

Accordingly, from the illustrative examples described above it can be seen that the bitumen compositions of the present invention are, in all aspects, excellent substitutes to known cold-applicable bituminous adhesives comprising chlorinated solvents.

TABLE 3

|  | Example 7 | Example 8 (comp.) |
|---|---|---|
| Solvent | n-Butyl Propionate | 1,1,1-Trichloroethane |
| A component[i] | | |
| % w Solvent | 80.3 | 82.6 |
| % w Kraton D-1184 | 12.4 | 10.9 |
| % w Inipol 002[iv] | 7.3 | 6.5 |
| % w B component[ii] | 86.3 | 84.9 |
| % w A component | 13.7 | 15.1 |
| Bitumen Composition[iii] | | |
| % w Solvent | 11.0 | 12.5 |
| % w Kraton D-1184 | 1.7 | 1.6 |
| % w Inipol 002 | 1.0 | 1.0 |
| % w Bitumen | 41.8 | 41.1 |
| % w Lithium Stereate | 4.8 | 4.8 |
| % w Filler | 39.7 | 39.0 |
| Dry Curing | | |
| 1 week | + | ++ |
| 2 week | ++ | ++ |
| Under Water Curing | | |
| 1 week | ++ | + |
| 1 month | ++ | ++ |

Good ++;
Medium +;
Poor −;
Bad −−
[i]Based on total weight of A component
[ii]Based on total weight of A + B
[iii]Based on total weight of bitumen composition
[iv]An oleic amine based waster repellant obtained from Ceca.

What is claimed is:

1. A bitumen composition comprising:
   (i) from 0.1 to 25% wt of an elastomer,
   (ii) from 0.1 to 40% wt of a solvent,
   (iii) from 30 to 99% wt of a bitumen,
   (iv) from 0.1 to 30% wt of a lithium salt of a $C_{10}$–$C_{40}$ fatty acid or hydroxy fatty acid, and optionally
   (v) from 0 to 70% wt of a filler, all weights based on total bitumen composition,
wherein the solvent is of general formula (I)

wherein $R^1$ represents a hydrogen atom or a hydrocarbyl group having from 1 to 6 carbon atoms, $R^2$ represents a hydrocarbyl group having from 1 to 6 carbon atoms, and the sum of the carbon atoms in $R^1$ and $R^2$ is from 5 to 7.

2. The bitumen composition of claim 1, wherein the elastomer is a block copolymer comprising at least two terminal poly(monovinylaromatic hydrocarbon) blocks and at least one central poly(conjugated diene) block.

3. The bitumen composition of claim 1, wherein, in the solvent of general formula (I), $R^1$ and $R^2$ each independently represent an alkyl group having from 2 to 4 carbon atoms and the sum of the carbon atoms in $R^1$ and $R^2$ is 6.

4. The bitumen composition of claim 3, wherein the solvent of general formula (I) is n-butyl propionate.

5. The bitumen composition of claim 1, wherein the bitumen has a penetration in the range of from 100 to 300 dmm.

6. The bitumen composition of claim 1, wherein the lithium salt is a lithium salt of a $C_{12}$–$C_{22}$ fatty acid or hydroxy fatty acid.

7. A process comprising using the bitumen composition of claim 1 as a cold-applicable adhesive.

8. A process of preparing a bitumen composition which comprises mixing a first component (A) comprising (i) from 0.1 to 25% wt of an elastomer, and (ii) from 0.1 to 40% wt of a solvent; with a second component (B) comprising (iii) from 30 to 99% wt of a bitumen, (iv) from 0.1 to 30% wt of a lithium salt of a $C_{10}$–$C_{40}$ fatty acid or hydroxy fatty acid, and optionally (v) from 0 to 70% wt of a filler, all weights based on total bitumen composition, wherein the solvent is of general formula (I)

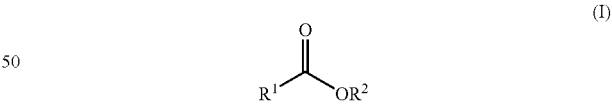

wherein $R^1$ represents a hydrogen atom or a hydrocarbyl group having from 1 to 6 carbon atoms, $R^2$ represents a hydrocarbyl group having from 1 to 6 carbon atoms, and the sum of the carbon atoms in $R^1$ and $R^2$ is from 5 to 7.

9. The process of claim 8 further comprising preparing component (B) by heating the bitumen to a temperature in the range of from 200 to 300° C., and then adding the lithium salt.

10. The process of claim 8, wherein the weight ratio of component (A) to component (B) is in the range of from 1:20 to 1:5.

11. The bitumen composition of claim 2, wherein, in the solvent of general formula (I), $R^1$ and $R^2$ each independently represent an alkyl group having from 2 to 4 carbon atoms and the sum of the carbon atoms in $R^1$ and $R^2$ is 6.

12. The bitumen composition of claim 2, wherein the bitumen has a penetration in the range of from 100 to 300 dmm.

13. The bitumen composition of claim 3, wherein the bitumen has a penetration in the range of from 100 to 300 dmm.

14. The bitumen composition of claim 4, wherein the bitumen has a penetration in the range of from 100 to 300 dmm.

15. The bitumen composition of claim 2, wherein the lithium salt is a lithium salt of a $C_{12}$–$C_{22}$ fatty acid or hydroxy fatty acid.

16. The bitumen composition of claim 3, wherein the lithium salt is a lithium salt of a $C_{12}$–$C_{22}$ fatty acid or hydroxy fatty acid.

17. The bitumen composition of claim 4, wherein the lithium salt is a lithium salt of a $C_{12}$–$C_{22}$ fatty acid or hydroxy fatty acid.

18. The bitumen composition of claim 5, wherein the lithium salt is a lithium salt of a $C_{12}$–$C_{22}$ fatty acid or hydroxy fatty acid.

19. A process comprising using the bitumen composition of claim 2 as a cold-applicable adhesive.

20. A process comprising using the bitumen composition of claim 3 as a cold-applicable adhesive.

21. A process comprising using the bitumen composition of claim 4 as a cold-applicable adhesive.

22. A process comprising using the bitumen composition of claim 5 as a cold-applicable adhesive.

23. A process comprising using the bitumen composition of claim 6 as a cold-applicable adhesive.

24. The process of claim 9, wherein the weight ratio of component (A) to component (B) is in the range of from 1:20 to 1:5.

* * * * *